United States Patent [19]

Klinar

[11] Patent Number: 5,408,897
[45] Date of Patent: Apr. 25, 1995

[54] WORM, ONTO WHICH A BEARING STUD IS FORMED, ESPECIALLY FOR A WINDSHIELD WIPING SYSTEM

[75] Inventor: Robert Klinar, Bietigheim-Bissingen, Germany

[73] Assignee: SWF Auto-Electric GmbH, Germany

[21] Appl. No.: 39,029

[22] PCT Filed: Jul. 29, 1992

[86] PCT No.: PCT/EP92/01718

§ 371 Date: Apr. 1, 1993

§ 102(e) Date: Apr. 1, 1993

[87] PCT Pub. No.: WO93/03296

PCT Pub. Date: Feb. 18, 1993

[30] Foreign Application Priority Data

Aug. 1, 1991 [DE] Germany ............... 41 25 491.0

[51] Int. Cl.⁶ ............... F16H 1/16; F16H 55/02
[52] U.S. Cl. ............... 74/425; 15/250.3; 29/893.31; 29/893.32
[58] Field of Search ............... 74/89.14, 425; 29/893, 29/893.2, 893.3, 983.31, 893.32; 384/537, 585; 15/250.3

[56] References Cited

U.S. PATENT DOCUMENTS

| | | | |
|---|---|---|---|
| 1,416,163 | 5/1922 | Bock | 74/425 |
| 1,898,945 | 2/1933 | Fitzgerald | 74/425 X |
| 2,657,591 | 11/1953 | Kaelin | 74/425 X |
| 3,362,059 | 1/1968 | Di Ponio et al. | 29/893.32 |
| 3,511,920 | 5/1970 | Hertfelder | 74/425 X |
| 3,923,408 | 12/1975 | Belsdorf | 403/326 X |
| 4,589,299 | 5/1986 | Kobayashi et al. | 74/425 X |
| 4,741,091 | 5/1988 | Settles | 384/585 X |
| 4,791,831 | 12/1988 | Behnke et al. | 74/425 X |

FOREIGN PATENT DOCUMENTS

| | | |
|---|---|---|
| 451597 | 8/1943 | Belgium . |
| 2257800 | 5/1973 | Germany ............... 29/893.32 |
| 59-127943 | 7/1984 | Japan . |
| 1137035 | 12/1968 | United Kingdom . |

OTHER PUBLICATIONS

Mark's Standard Handbook for Mechanical Engineers, McGraw Hill Book Co., N.Y., 9th Edition, 1987, pp. 8-136.

Primary Examiner—Allan D. Herrmann
Attorney, Agent, or Firm—Dykema Gossett

[57] ABSTRACT

A bearing having to be assembled onto a shaft with a worm by passing over the worm where the diameter of the bearing section is larger than the outside diameter of the worm can be produced in a manner which saves material if not only the worm, but also the bearing section is non-cuttingly formed by rolling the basic material. It is possible to grind the bearing section at the outside, if necessary, and in an advantageous way, so that it is true to size and cylindrical.

10 Claims, 1 Drawing Sheet

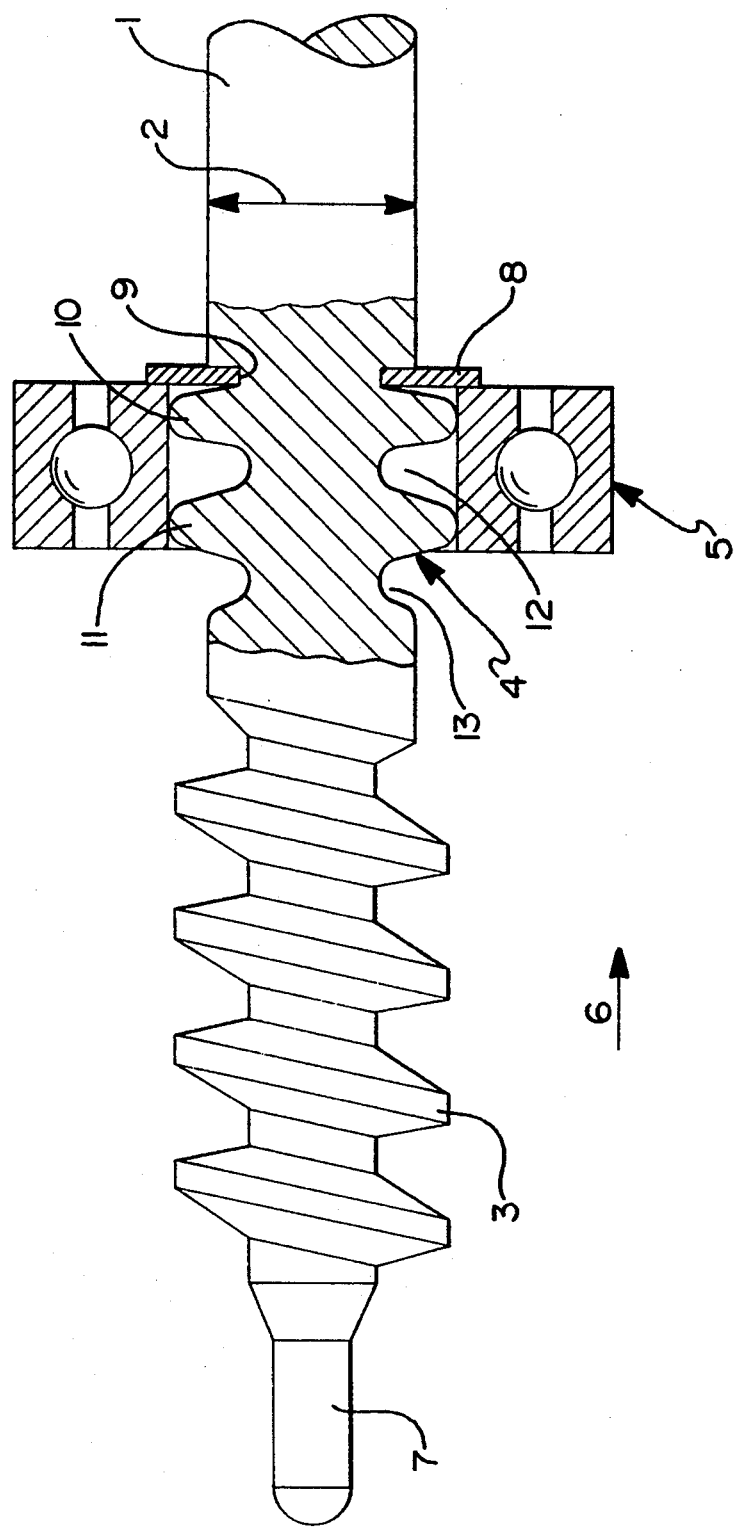

WORM, ONTO WHICH A BEARING STUD IS FORMED, ESPECIALLY FOR A WINDSHIELD WIPING SYSTEM

BACKGROUND

The invention relates to a worm, especially for a worm gear of a windshield wiping system, onto which at least one bearing section is formed. When the worm is directly driven by an electric motor having a commutator which is doubly mounted, one of the bearings being situated between the worm and the commutator the bearing can only be slipped over the corresponding bearing section between the worm and the commutator, if the diameter of this bearing section exceeds the outside diameter of the worm so that the inside diameter of the bearing be correspondingly larger than the outside diameter of the worm.

When the worm is formed by rolling leading to an extension of the outside diameter compared to the original diameter of the basic material, a bigger bearing section can only be realized in a conventual manner if a basic material having a diameter larger than the one of the ready-made worm is used. In the area of the worm to be rolled, the outside diameter has to be turned to the necessary size first.

The object of the invention is to provide a worm onto which at least one bearing section is formed, which allows the use of a basic material smaller in diameter than the formed bearing section but which nevertheless permits the bearing to be slipped over the ready-made worm.

SUMMARY

In order to solve this object, the invention provides a worm, especially for a worm gear of a windshield wiping system onto which at least one bearing section is formed. The worm as well as tile bearing section are formed by rolling, and the outside diameter of the bearing section exceeds the outside diameter of the worm at least slightly. While the bearing section is rolled, care must be taken that the material is pushed aside such that the outside diameter exceeds the diameter of the worm in the area of the bearing section. During the rolling process the material is known to deform from the force exerted by the rolling tool in radial direction. This means that depending on the shape of the rolling tool and its adjusting depth, radial expansion can be affected within certain limits. This invention is of particular significance, when the mentioned bearing section is situated between the worm and an even larger shaft diameter which is the case, for example, when the bearing section is situated between the worm and a commutator which is non-rotatably connected with the worm, the diameter of which commutator is normally in excess of the diameter of the bearing.

Since it is now possible to extend the diameter in the bearing area by the rolling process, it is sufficient to use a basic material of a smaller diameter so that material and cutting energy can be economized.

An improvement upon the invention resides in the fact that the worm and the bearing section are formed from a round rod of an equal original diameter in these areas. Hence the basic materials is provided with a constant outside diameter in the area of bearing section and worm. Accordingly, a larger bearing section diameter can be obtained by a more intense rolling of the material in the area of the bearing section with regard to the worm.

Furthermore, it is very advantageous that the outside diameter of at least the bearing section is ground true to size so that an also true to size inside ring of a roller bearing can be slipped over the bearing section in a known manner. In order to be able to fix said inside ring axially, when it is slipped over, a further embodiment of the invention suggests that a retaining ring, for example a snap ring, is placed at the end of the bearing section remote from the worm and is snapped into a corresponding groove.

More particularly, it is planned that the bearing section is essentially formed by two outside shoulders, the inside distance of which is defined by the width of the inside ring of the specified roller bearing.

BRIEF DESCRIPTION OF THE DRAWING

FIG. 1 is a partial side view in partial cross-section depicting the worm and bearing.

DETAILED DESCRIPTION OF THE PREFERRED EMBODIMENT

Referring to the FIGURE, a worm 3 and a bearing section 4 are formed by rolling onto a shaft 1, the basic material having a constant diameter 2 in the herein relevant area. As a result of this manufacturing process, the outside diameter extends in a known manner in the mentioned areas. According to the invention, rolling is performed such that the outside diameter of the bearing section 4 is slightly larger than the outside diameter of the worm 3, so that a bearing 5, for example a rolling bearing can be slipped over the bearing section 4 in the sense of arrow 6, passing over the worm 3. At the right side of the drawn area, the shaft 1 can obtain a larger diameter, as well as the diameter at the left side of the worm 3 can be reduced in order to form an end stud 7.

In the preferred embodiment, the shaft 1 is a rotor shaft of an electric motor onto which a worm 3 is integrally formed and with a commutator, not shown in detail, on the other side of the bearing 5 from the worm. Consequently, the bearing 5 has to be assembled in direction of arrow 6. In order to limit the slip-on movement of the bearing 5, a standard retaining ring 8, for example a snap ring inserted into a corresponding groove 9 of the shaft 1, is situated at the right side of the bearing section 4, at the end of the bearing section opposite the worm.

In the preferred embodiment, the bearing section 4 essentially consists of two outside shoulder 10 and 11. The outside shoulders 10 and 11 are formed by pressure from the rolling tool at the positions 12 and 13 of the basic material. The rolling tool can be the same rolling tool which is used for the manufacturing of the worm 3,pressed into the material more deeply, so that the larger outside diameter of shoulder 10 and 11 results. As can be seen from the difference in the outline of the worm 3, compared to the bearing section 4, separate rolling tools can also be used for manufacturing these two elements to obtain the required cross-sectional form, especially of the worm 3.

If the shoulders 10 and 11 are produced during the rolling of the worm 3, while the shaft 1 is axially displaced, these shoulders will also have the shape of windings, permitting their whole axial extension to be made slightly larger than the axial extension of the bearing 5. The winding shape can be avoided if the rolling tool for the bearing section 4 is moved along axially with the shaft 1 or if the bearing section 4 is produced only after the worm 3 is formed, while the shaft 1 remains stationary in the axial direction.

Whether post-working of the worm 3, especially grinding of its outside diameter is necessary, depends on the individual case. As, however, a closely tolerated machine element, namely bearing 5, is slipped onto the bearing section 4, it is useful in any case, if not even necessary, that the outside diameter of the rolled bearing section 4 is worked, for example ground, in order to obtain cylindrical bearing surfaces of the outside shoulders 10, 11. It is reasonable in any case that more than two outside shoulders 10 and 11 can be provided.

What is claimed is:

1. An assembly for use in a windshield wiping system, comprising:
    an axially extending main body, said main body including a worm gear section and a bearing section, said worm gear section and said bearing section being integrally formed from said main body, said worm gear section being immediately adjacent said bearing section and having a free end, said main body terminating approximately at said free end, said worm gear section having an outside diameter of a first dimension, and said bearing section having at least two axially spaced shoulders, said bearing section having an outside diameter of a second dimension, said second dimension being greater than said first dimension; and
    a bearing received on said shoulders and extending circumferentially about said bearing section, said bearing having an inside diameter corresponding approximately with said outside diameter of said bearing section of said main body, said bearing being slidable over said free end and said worm gear section during assembly, wherein said outside diameter of said bearing section is greater than any portion of said main body, said bearing contacting said at least two axially spaced shoulders.

2. The assembly of claim 1 wherein said main body includes a cylindrical section adjacent said bearing section, said cylindrical section having a generally constant cross section and a smooth outside surface.

3. The assembly of claim 2 wherein an area between said shoulders of said bearing section has an outside diameter less than an outside diameter of said cylindrical section due to deformation of said main body to form said shoulders of said bearing section.

4. The assembly of claim 1 further comprising a retainer ring, said retainer ring being seated in a groove on said main body adjacent said bearing section, said retainer ring preventing axial movement of said bearing with respect to said main body.

5. An axially extending windshield wiper component comprising:
    a first section including an end stud at one end thereof;
    a second section immediately adjacent said first section and opposite said end stud; and
    a third section immediately adjacent said second section, wherein said first section, second section and said third section are integrally formed, said first section including a worm gear having an outside diameter of a first dimension, said second section including a bearing section having an outside diameter of a second dimension, said third section being a shaft having an outside diameter of a third dimension, said second dimension being greater than said first dimension and said third dimension, wherein said second dimension of said second section exceeds an outside diameter of any section of said component, and a bearing is adapted to be slidable over said end stud of said first section so that said bearing may be seated on said second section.

6. The component of claim 5 wherein said bearing section includes a pair of shoulders defining axially spaced cylindrical bearing surfaces, said pair of shoulders having a diameter of approximately the same dimension.

7. The component of claim 6 wherein said component further includes said bearing seated on said bearing surfaces of said pair of shoulders.

8. The component of claim 7 wherein said bearing has an inside diameter corresponding approximately to said outside diameter of said second section.

9. A method for producing a worm gear component for a windshield wiping system having a bearing section with an outside diameter larger than an outside diameter of a worm gear section, said worm gear section and said bearing section being formed from a cylindrical stock of material having a constant diameter, said stock having a diameter less than said outside diameter of said bearing section, said method comprising the steps of:
    providing a cylindrical stock of material, said stock having a constant cross section and having a diameter of a first dimension;
    forming windings from said material of said stock to define a worm gear section, said worm gear section having an outside diameter of a second dimension, said second dimension being greater than said first dimension, said windings being formed by deforming said material of said stock to extend radially outwardly to increase said diameter of said stock at said windings; and
    forming a pair of axially spaced shoulders from said material of said stock to define a bearing section, said bearing section having an outside diameter of a third dimension, said third dimension being greater than said first dimension and said second dimension, said shoulders being formed by deforming said material of said stock to extend radially outwardly to increase said diameter of said stock at said shoulders.

10. The method of claim 9 further comprising the step of grinding said shoulders of said bearing section to an outside diameter less than said third dimension to provide a precise dimension at said shoulders.

* * * * *